US009448317B2

(12) United States Patent
Bekara

(10) Patent No.: US 9,448,317 B2
(45) Date of Patent: Sep. 20, 2016

(54) METHOD FOR SWELL NOISE DETECTION AND ATTENUATION IN MARINE SEISMIC SURVEYS

(75) Inventor: Maïza Bekara, Weybridge (GB)

(73) Assignee: PGS GEOPHYSICAL AS, Oslo (NO)

( * ) Notice: Subject to any disclaimer, the term of this patent is extended or adjusted under 35 U.S.C. 154(b) by 1512 days.

(21) Appl. No.: 12/806,700

(22) Filed: Aug. 19, 2010

(65) Prior Publication Data
US 2012/0044782 A1 Feb. 23, 2012

(51) Int. Cl.
 G01V 1/06 (2006.01)
 G01V 1/36 (2006.01)
(52) U.S. Cl.
 CPC ....... G01V 1/364 (2013.01); *G01V 2210/532* (2013.01)
(58) Field of Classification Search
 USPC ...................................................... 367/24, 46
 See application file for complete search history.

(56) References Cited

U.S. PATENT DOCUMENTS

| | | | | |
|---|---|---|---|---|
| 4,884,248 A | * | 11/1989 | Laster et al. | 367/73 |
| 4,953,139 A | * | 8/1990 | Laster et al. | 367/73 |
| 6,668,228 B1 | * | 12/2003 | Ozbek et al. | 702/17 |
| 2003/0078734 A1 | * | 4/2003 | Ozbek | 702/14 |
| 2004/0076249 A1 | * | 4/2004 | Comparsi De Castro et al. | 375/350 |
| 2006/0050612 A1 | | 3/2006 | Zerouk | |
| 2010/0161235 A1 | * | 6/2010 | Ikelle | 702/17 |

OTHER PUBLICATIONS

Anderson, R., McMechan, G., "Automatic editing of noisy seismic data", Geophysical Prospecting, 1989, vol. 37, Issue 8, p. 875-892.
Holcombe, H., Wojslaw, R., "Spatially weighted trim stacking: A technique for prestack noise suppression" 1992, SEG Exp. Abstr. 11, p. 1157-1160.
Sourabas, R., "Signal-preserving random noise attenuation by the F-X Projection", 1994, SEG Exp. Abstr. 13, p. 1576-1579.
Schonewille, M., Vigner, A., Ryder, A., "Advances in swell-noise attenuation", 2008, First Break, vol. 26, December, p. 103-108.

* cited by examiner

*Primary Examiner* — James Hulka

(57) ABSTRACT

Spatial data sequences are extracted in a frequency-space domain at selected frequencies in selected data windows in seismic data. A signal model and residuals are iteratively constructed for each extracted spatial data sequence. Each data sample in each extracted spatial data sequence is assessed to determine if the data sample is noisy. Each noisy data sample in each data sequence is replaced by a corresponding signal model value. The earth's subsurface is imaged using the noise-attenuated seismic data.

14 Claims, 3 Drawing Sheets

METHOD FOR SWELL NOISE DETECTION AND ATTENUATION IN MARINE SEISMIC SURVEYS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of imaging marine seismic streamer data.

2. Description of the Related Art

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and returning from reflective interfaces.

One problem in processing marine seismic data acquired with towed streamers is swell noise. Swell noise can occur whenever the data are acquired in rough sea conditions. Swell noise has a low frequency contents, typically below 30 Hz, and relatively large amplitudes. Attenuating swell noise is important for constructing accurate images of the earth's subsurface.

Early techniques for swell noise attenuation were based on analyzing the low frequency content of the seismic traces in the time-space domain (t-x) to identify anomalous large values that represent swell noise contamination. The detected noisy samples were then corrected by scaling or interpolation using neighboring traces. However, time-space techniques have the disadvantage of distorting useful signal components in the process of removing swell noise.

The seismic industry has now moved to a more signal-friendly approach to remove swell noise in the frequency-space domain (f-x). Large amplitudes in the frequency-space spectrum of the data are detected and then corrected by interpolation using a prediction/projection error filter. An improved performance can be achieved when the predictive/projection error filtering is iteratively repeated or estimated from non-noisy samples (typically at a higher frequency) and then applied to the noisy data.

However, in all the current technologies for swell noise attenuation, no spatial information is used to improve the detection of incoherent noisy samples and to reduce the false detection of large amplitude coherent signal samples, as the detection is based on absolute non-ordered amplitudes. Also, the fact that swell noise has a narrow-bandwidth is not exploited to adapt the detection sensitivity to the level of noise. Hence, these current techniques may lead to sub-optimal noise detection performances and may result in signal distortion as well.

Thus, a need exists for a more effective method for detecting and attenuating swell noise in towed streamer marine seismic survey data to provide more accurate images of the earth's subsurface.

BRIEF SUMMARY OF THE INVENTION

The invention is a method for imaging the earth's subsurface. A programmable computer is used to perform the following. Spatial data sequences are extracted in the frequency-space domain at selected frequencies in selected data windows in seismic data. A signal model and residuals are iteratively constructed for each extracted spatial data sequence. Each data sample from each extracted spatial data sequence is assessed to determine if the data sample is noisy. Each noisy data sample in each extracted spatial data sequence is replaced by a corresponding signal model value. The earth's subsurface is imaged using the noise-attenuated seismic data.

BRIEF DESCRIPTION OF THE DRAWINGS

The invention and its advantages may be more easily understood by reference to the following detailed description and the attached drawings, in which.

Figure 1:
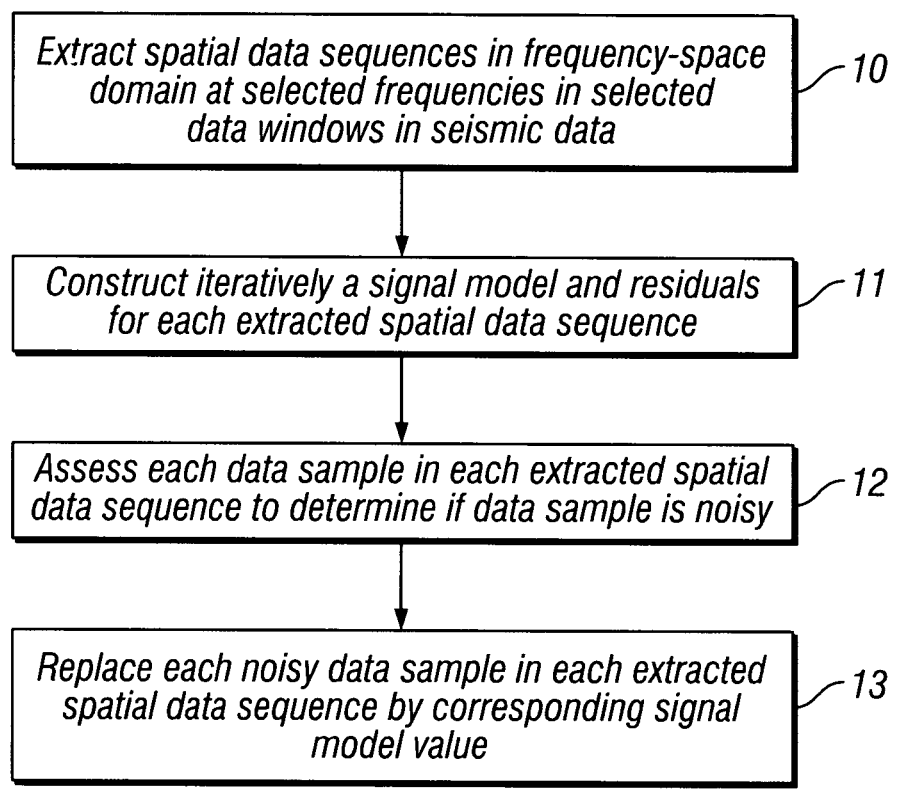
FIG. 1 is a flowchart illustrating an embodiment of the invention for imaging the earth's subsurface.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

Conventional techniques to attenuate swell noise typically use a two-step process of detection and correction. Initially, the frequency-space (f-x) amplitude spectrum of the data is computed. Then, in the first step, detection of noisy traces, all spectral values at a given frequency that exceed a selected threshold value are considered to be noise. Then, in the second step, correction of noisy traces, the detected noisy traces are interpolated by applying a prediction/projection error filter (PEF). Finally, the corrected amplitude spectrum is transformed back to the original time-space domain.

The threshold value in the detection step is usually computed as:

$$\text{Thrs} = \alpha \hat{S}. \tag{1}$$

The quantity $\hat{S}$ is a statistical measure, such as the median or the RMS (root mean square) value, computed from the input amplitude spectrum samples, and $\alpha$ is a positive factor, referred to as the threshold factor. The threshold factor $\alpha$ is a user-controlled parameter that quantifies the "harshness" of the swell noise filtering procedure. Despite the fact that the threshold value Thrs in Equation (1) is adapted to the data through the statistical measure $\hat{S}$, practical experience shows that the threshold factor $\alpha$ is often changed if the noise characteristics vary considerably across the data set.

This strategy of the detection step in the conventional technique does not take into account the presence of spatial coherency in the data. For instance, if a set of coherent traces are randomly swapped pair-wise (hence, removing the spatial coherency), the threshold value Thrs in Equation (1) would be unchanged no matter which data statistic measure $\hat{S}$ is used. Coherency in the data is only taken into account at the later independent correction step by using frequency-space (f-x) prediction/projection to correct (interpolate) the previously detected noise traces. Therefore, the noise detection step is disjointed from the noise correction step and this may result in a sub-optimal noise attenuation result. For example, a strong direct arrival may be misidentified as noise.

Conventional techniques also ignore the fact that swell noise has a narrow frequency bandwidth, which implies that the signal-to-swell noise ratio is frequency-dependent. However, a constant threshold factor $\alpha$ is typically used for all the frequencies in the processing band. This simplistic use of a constant $\alpha$ may also lead to sub-optimal noise detection performances, which may result in signal distortion. For this reason, conventional techniques are often run in cascade to target different frequency bands with different levels of harshness.

The present invention is a method for improved imaging of the earth's subsurface using marine seismic data. In particular, the invention is a method for improved attenuation of swell noise in marine seismic data acquired by towed seismic streamers.

The present invention provides a method of swell noise attenuation in the frequency-space domain. The method jointly detects and corrects for noisy traces by means of spatial predictive modeling of the signal. The invention also proposes an adaptive noise threshold computation to reflect the variation of the signal-to-swell noise ratio throughout the frequency band.

The method of the invention takes spatial coherency information into account and combines the detection and correction (interpolation) of noisy traces into one step instead of two. The localization of noisy traces is still based on an amplitude threshold strategy, but the thresholding is not performed on the input data. Instead, thresholding is performed on the residuals resulting from subtracting a derived signal model from the input data, where the signal model is obtained by prediction/projection error filtering in the frequency-space domain. The method of the invention has the potential advantage of reducing the false detection of spatially-coherent large amplitude signal components, such as direct arrivals, as being noise. Current technologies perform noise detection on the input data, which is equivalent to assuming a "zero" signal model.

Estimating a signal model from large noisy amplitude may produce a "biased" model. To reduce the effect of noise on the model, an iterative robust estimator is used. The robust estimation weights the contribution of each sample, inversely proportional to its amplitude, in building the model for the signal. This estimation is fed back in a closed loop and results in an iterative model-building and residual-assessment cycle that runs until convergence is reached.

The method of the invention also varies the harshness of the swell noise filter for each frequency to account for the fact that swell noise has a narrow bandwidth. This is done by setting the threshold factor $\alpha$ in Equation (1) equal to a user-input value at peak frequency of the swell noise $f_{max}$ and increasing this factor as the processing frequency moves away from $f_{max}$. This process is described in more detail with regard to the flowchart in FIG. 3, below.

The invention is a method of noise attenuation used in a typical processing sequence for imaging the earth's subsurface. In one embodiment, a programmable computer is used to perform the following. A frequency-space data window is obtained by transforming each time-space data window from the seismic data. Then for each frequency a spatial sequence is extracted from the frequency-space data window. A signal model and residuals are iteratively constructed for each extracted spatial sequence. Each data sample in the spatial sequence is assessed to see if it is noisy based on the amplitude of its corresponding residual. If the data sample is judged to be noisy then it is replaced (interpolated) by its corresponding signal model value. The method of the invention is tailored toward removing narrow-bandwidth high amplitude noise such as swell, but is not limited to it.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

FIG. 1 is a flowchart illustrating an embodiment of the invention for imaging the earth's subsurface.

At block 10, spatial data sequences are extracted in a frequency-space domain at selected frequencies in selected data windows in seismic data.

At block 11, a signal model and residuals are iteratively constructed for each extracted spatial data sequence.

At block 12, each data sample in each extracted spatial data sequence is assessed to determine if the data sample is noisy.

At block 13, each noisy data sample is replaced in each extracted spatial data sequence by a corresponding signal model value. (Non-noisy data samples are not replaced.)

Figure 2:
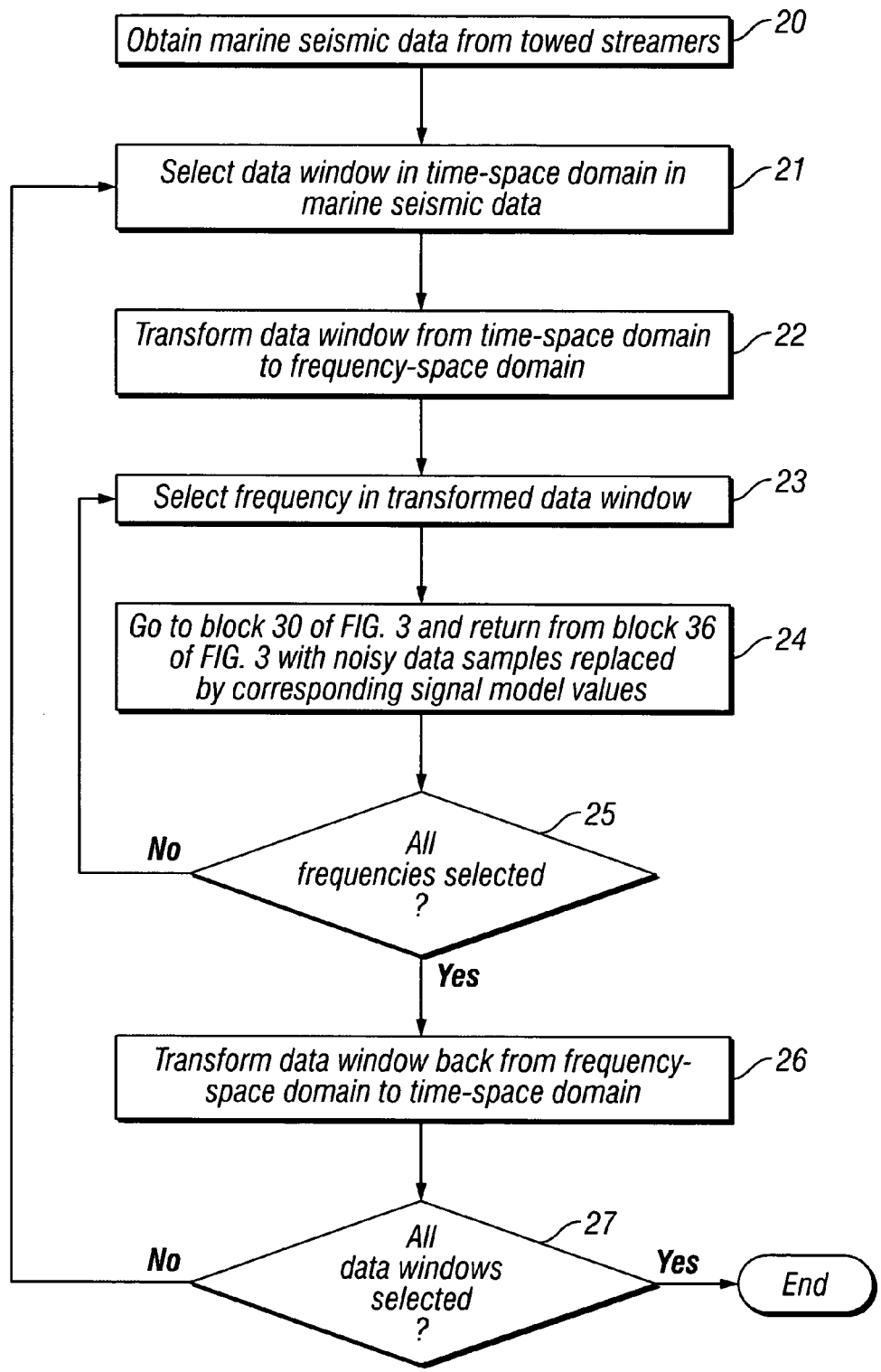
FIG. 2 is a flowchart illustrating a portion of another embodiment of the invention for imaging the earth's subsurface.
Figure 3:
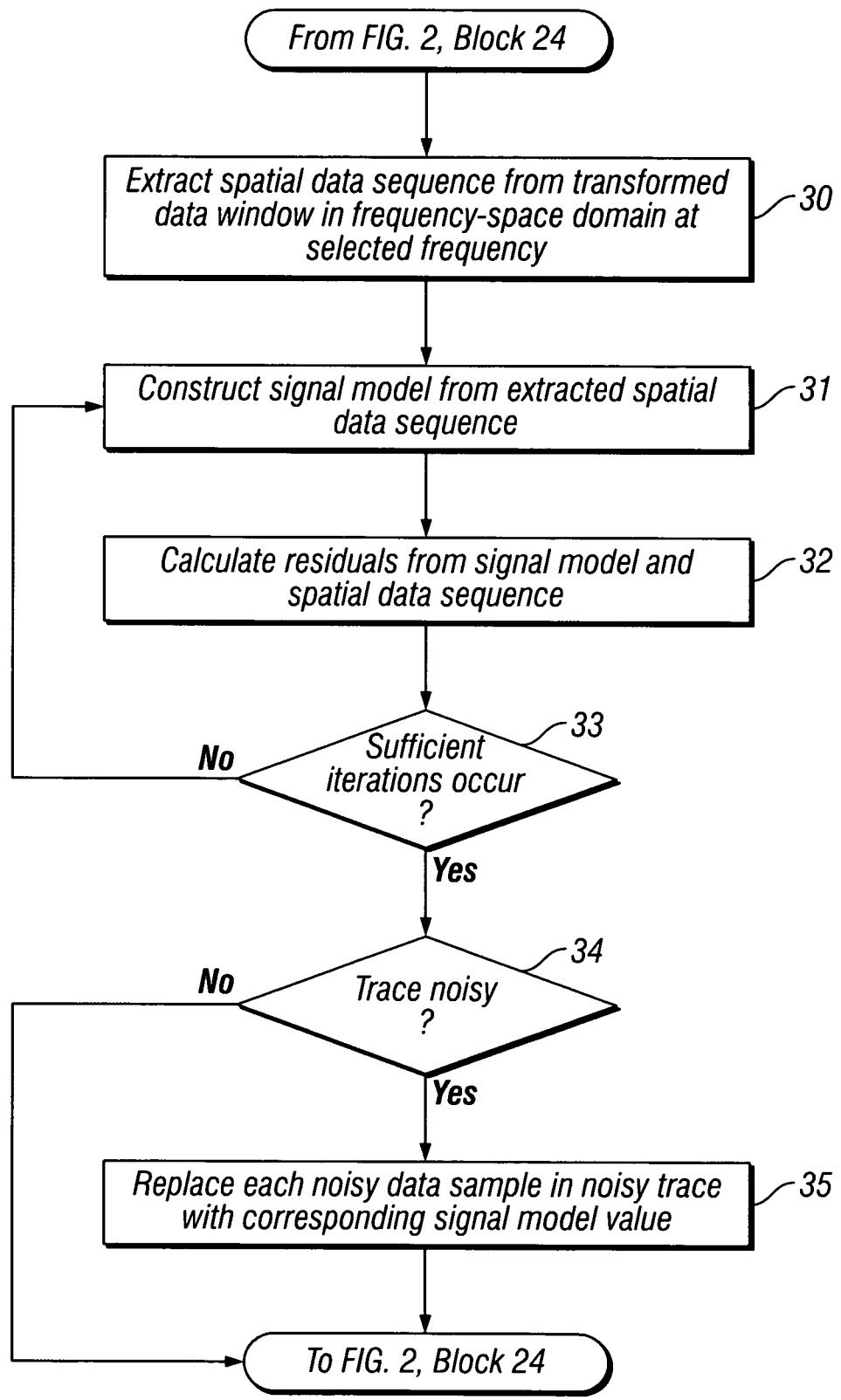
FIG. 3 is a flowchart illustrating another portion of the other embodiment of the invention begun in FIG. 2.

FIGS. 2 and 3 are flowcharts illustrating another embodiment of the invention for imaging the earth's subsurface. FIGS. 2 and 3 provide a more detailed description of the invention illustrated in FIG. 1. FIG. 2 is a flowchart illustrating a portion of the other embodiment of the invention for imaging the earth's subsurface.

At block 20, marine seismic data are obtained from towed seismic streamers. The seismic data may comprise pressure sensor data, such as from hydrophones, or particle motion sensor data, such as from geophones or accelerometers. Obtaining the seismic data includes retrieving previously acquired data from storage, such as computer memory or other types of memory storage devices or media.

At block 21, a data window is selected in the time-space (t-x) domain from the marine seismic data obtained in block 20. The data windows are designed to overlap in the time and space dimensions and to cover the seismic data desired to be processed for imaging. The selection of data windows may be done in any manner, although a systematic approach is preferred for efficiency.

At block 22, the data window selected in block 21 is transformed from the time-space (t-x) domain to the frequency-space (f-x) domain. Any appropriate domain transforms, well-known in the art, may be employed. For example, frequency-slowness transforms may be used. However, the type of transform is not intended to be a restriction of the invention.

At block 23, a frequency f is selected in the transformed data window from block 22. The selection of frequencies may be done in any manner, although a systematic approach is preferred for efficiency.

At block 24, the process proceeds to block 30 of FIG. 3 and returns from block 36 of FIG. 3 with noisy data samples replaced by corresponding signal model (interpolation) values.

At block 25, it is determined if all the frequencies f from block 23 have been selected in the transformed data window from block 22. If it is determined that not all the frequencies have been selected, then the process returns to block 23 to select another frequency. If it is determined that all the frequencies have been selected, then the process proceeds to block 26.

At block 26, the data window is transformed back from the frequency-space (f-x) domain to the time-space (t-x) domain. Any appropriate domain transforms, well-known in the art, may be employed. For example, inverse frequency-slowness transforms may be used. Again, the type of transform is not intended to be a restriction of the invention.

At block 27, it is determined if all the data windows from block 21 have been selected from the seismic data from block 20. If it is determined that not all the data windows have been selected, then the process returns to block 21 to select another data window. If it is determined that all the data windows have been selected, then the process ends.

FIG. 3 is a flowchart illustrating another portion of the other embodiment of the invention begun in FIG. 2.

At block 30, a spatial data sequence D is extracted from the transformed data window in the frequency-space domain from block 22 of FIG. 2 at the frequency f selected in block 23:

$$D = \{d_1, d_2, \ldots, d_n\}, \quad (2)$$

where $$d_i \text{ for } i \in \{1, 2, \ldots, n\}$$

is the Fourier transform at frequency f of the $i^{th}$ trace in the processing window.

At block 31, for each iteration t, a signal model:

$$\hat{S}^{(t)} = \{s_1^{(t)}, s_2^{(t)}, \ldots, s_n^{(t)}\} \quad (3)$$

is constructed from the coefficients:

$$(a_1^{(t)}, a_2^{(t)}, \ldots, a_p^{(t)}),$$

such that:

$$s_i^{(t)} = \sum_{k=1}^{p} a_k^{(t)} d_{i-k}.$$

In one embodiment, the signal model is constructed by finding coefficients that minimize the cost function:

$$\sum_{i=1}^{n} \psi \left( d_i - \sum_{k=1}^{p} a_k^{(t)} d_{i-k} \right), \quad (4)$$

where the building block of the cost function in Equation (4) is defined by the mapping:

$$\psi(\varepsilon) = \begin{cases} |\varepsilon|^2 & \text{for } |\varepsilon| < A^{(t)} \\ A^2 & \text{for } |\varepsilon| \geq A^{(t)} \end{cases} \quad (5)$$

and the mapping $\psi(\epsilon)$ in Equation (5) depends on a variable quantity value $A^{(t)}$ given by:

$$A^{(t)} = \mu(f) \times \text{median}\{\hat{R}^{(t-1)}\}. \quad (6)$$

Here, $\hat{R}^{(t-1)}$ in Equation (6) is the residual at the (t-1) iteration, where the residual is defined by:

$$\hat{R}^{(t-1)} = D - \hat{S}^{(t-1)} \quad (7)$$
$$= (d_1 - s_1^{(t-1)}, d_2 - s_2^{(t-1)}, \ldots, d_n - s_n^{(t-1)})$$
$$= (r_1^{(t-1)}, r_2^{(t-1)}, \ldots, r_n^{(t-1)}),$$

and the parameter $\mu(f)$ is a frequency-dependent threshold factor defined as:

$$\mu(f) = \begin{cases} \mu_1 - \dfrac{f - f_1}{f_{peak} - f_1}(\mu_1 - Thrs) & \text{for } f_{min} \leq f < f_{peak} \\ Thrs & \text{for } f = f_{peak} \\ \mu_2 - \dfrac{f_2 - f}{f_2 - f_{peak}}(\mu_2 - Thrs) & \text{for } f_{peak} < f \leq f_{max}, \end{cases} \quad (8)$$

where $f_{min}$ is minimum processing frequency, $f_{max}$ is maximum processing frequency, $f_{peak}$ is peak frequency of the swell noise, Thrs is the user's input value for the threshold factor at the peak frequency, and $$f_1 = f_{min} - \Delta f$$
$$f_2 = f_{max} + \Delta f \quad (9)$$

where $\Delta f$ is the step frequency. The quantities $$\mu_k = \frac{\max\{\hat{R}_k\}}{\text{median}\{\hat{R}_k\}} \text{ for } k = 1, 2, \quad (10)$$

define the corresponding threshold values at frequencies $f_1$ and $f_2$, and $\hat{R}_k$ is the residual (input data sequence—signal model) at each frequency $f_k$. In one preferred embodiment, the signal model is obtained using a prediction/projection error filter (PEF).

At block 32, residuals are calculated corresponding to the signal model constructed in block 31 and the spatial data sequence extracted in block 30. In one embodiment, the residuals are calculated as in Equation (7), above.

At block 33, it is determined if sufficient iterations t have occurred. In one particular embodiment, sufficient iterations are determined to have occurred for iteration T=t when:

$$A^{(T)} \approx A^{(T-1)}. \quad (11)$$

If it is determined that sufficient iterations have not occurred, then the process returns to block 31. If it is determined that sufficient iterations have occurred, then the process proceeds to block 34.

At block 34, it is determined if the trace k is noisy. In one particular embodiment, the trace k is determined to be noisy if the amplitude of the residual satisfies:

$$|r_k^{(T)}| \geq A^{(T)}. \quad (12)$$

If it is determined that the trace k is noisy, then the process proceeds to block 35. If it is determined that the trace k is not noisy, then the process proceeds to block 24 of FIG. 2.

At block 35, (in the case that the trace k is noisy) then the noisy spatial data sample $d_k$ is replaced by the corresponding signal model interpolation value $s_k^{(T)}$. Then the process returns to block 24 of FIG. 2.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for imaging the earth's subsurface, comprising using one or more programmable computers programmed to perform at least the following:
   extracting spatial data sequences in a frequency-space domain at selected frequencies in selected data windows in seismic data;
   constructing iteratively a signal model and residuals for each extracted spatial data sequence;
   assessing each data sample in each extracted spatial data sequence to determine if the data sample is noisy;

replacing each noisy data sample in each extracted spatial data sequence by a corresponding signal model value to generate noise attenuated seismic data; and imaging the earth's subsurface using the noise-attenuated seismic data.

2. The method of claim 1, wherein the extracting spatial data sequences initially comprises:

obtaining marine seismic data from towed seismic streamers;

selecting data windows in the marine seismic data; and performing the following for each selected data window in the seismic data;

transforming the selected data window from the time-space domain to the frequency-space domain; and selecting frequencies in the transformed data window.

3. The method of claim 2, wherein the replacing each noisy data sample further comprises:

determining if sufficient iterations have occurred; and transforming the data window back from the frequency-space domain to the time-space domain.

4. The method of claim 2, wherein the constructing iteratively a signal model comprises minimizing the cost function:

$$\sum_{i=1}^{n} \psi\left(d_i - \sum_{k=1}^{p} a_k^{(t)} d_{i-k}\right)$$

where the data sequence D is given by:

$D = \{d_1, d_2, \ldots, d_n\}$, the signal model is given for each iteration t by:

$\hat{S}^{(t)} = \{s_1^{(t)}, s_2^{(t)}, \ldots, s_n^{(t)}\}$, where the building block of the cost function is defined by the mapping:

$$\psi(\varepsilon) = \begin{cases} |\varepsilon|^2 & \text{for } |\varepsilon| < A^{(t)} \\ A^2 & \text{for } |\varepsilon| \geq A^{(t)}, \end{cases}$$

and the mapping $\psi(\varepsilon)$ depends on a variable quantity value $A^{(t)}$ given by:

$A^{(t)} = \mu(f) \times \text{median}\{\hat{R}^{(t-1)}\}$, and the parameter $\mu(f)$ is a frequency-dependent threshold factor defined as:

$$\mu(f) = \begin{cases} \mu_1 - \dfrac{f - f_1}{f_{peak} - f_1}(\mu_1 - Thrs) & \text{for } f_{min} \leq f < f_{peak} \\ Thrs & \text{for } f = f_{peak} \\ \mu_2 - \dfrac{f_2 - f}{f_2 - f_{peak}}(\mu_2 - Thrs) & \text{for } f_{peak} < f \leq f_{max}, \end{cases}$$

where $f_{min}$ is minimum processing frequency, $f_{max}$ is maximum processing frequency, $f_{peck}$ is peak frequency of the swell noise, Thrs is the user's input value for the threshold factor at the peak frequency, and $f_1 = f_{min} - \Delta f$ $f_2 = f_{max} + \Delta f$ where $\Delta f$ is the step frequency, and $$\mu_k = \frac{\max\{\hat{R}_k\}}{\text{median}\{\hat{R}_k\}} \text{ for } k = 1, 2,$$

at frequency $f_k$.

5. The method of claim 4, wherein the constructing iteratively residuals comprises applying the following equation:

$$\hat{R}^{(t-1)} = D - \hat{S}^{(t-1)}$$
$$= (d_1 - s_1^{(t-1)}, d_2 - s_2^{(t-1)}, \ldots, d_n - s_n^{(t-1)})$$
$$= (r_1^{(t-1)}, r_2^{(t-1)}, \ldots, r_n^{(t-1)}).$$

6. The method of claim 5, wherein the determining if sufficient iterations t have occurred comprises applying the following equation:

$A^{(T)} \approx A^{(T-1)}$, for T=t.

7. The method of claim 5, wherein the determining if a trace is noisy comprises applying the following equation:

$|r_k^{(T)}| \geq A^{(T)}$.

8. A non-transitory computer readable medium with a computer program stored thereon, the program having logic operable to cause a programmable computer to perform steps to provide an image of earth's subsurface from seismic data from a multi-azimuth marine seismic survey, comprising:

extracting a spatial data sequence in a frequency-space domain at each frequency from each data window in seismic data;

constructing iteratively a signal model and residuals for each extracted spatial data sequence;

assessing each data sample in the extracted spatial data sequence to determine if the data sample is noisy;

replacing each noisy data sample in each extracted spatial data sequence by a corresponding signal model value to generate noise attenuated seismic data; and imaging the earth's subsurface using the noise attenuated seismic data.

9. The medium of claim 8, wherein the extracting spatial data sequences initially comprises:

obtaining marine seismic data from towed seismic streamers;

selecting data windows in the marine seismic data; and performing the following for each selected data window in the seismic data;

transforming the selected data window from the time-space domain to the frequency-space domain; and selecting frequencies in the transformed data window.

10. The medium of claim 9, wherein the replacing each noisy data sample further comprises:

determining if sufficient iterations have occurred; and transforming the data window back from the frequency-space domain to the time-space domain.

11. The medium of claim 9, wherein the constructing iteratively a signal model comprises minimizing the cost function:

$$\sum_{i=1}^{n} \psi\left(d_i - \sum_{k=1}^{p} a_k^{(t)} d_{i-k}\right)$$

where the data sequence D is given by:

$$D = \{d_1, d_2, \ldots, d_n\},$$

the signal model is given for each iteration t by:

$$\hat{S}^{(t)} = \{s_1^{(t)}, s_2^{(t)}, \ldots, s_n^{(t)}\},$$

where the building block of the cost function is defined by the mapping:

$$\psi(\varepsilon) = \begin{cases} |\varepsilon|^2 & \text{for } |\varepsilon| < A^{(t)} \\ A^2 & \text{for } |\varepsilon| \geq A^{(t)}, \end{cases}$$

and the mapping $\psi(\varepsilon)$ depends on a variable quantity value $A^{(t)}$ given by:

$$A^{(t)} = \mu(f) \times \text{median}\{\hat{R}^{(t-1)}\},$$

and the parameter $\mu(f)$ is a frequency-dependent threshold factor defined as:

$$\mu(f) = \begin{cases} \mu_1 - \dfrac{f - f_1}{f_{peak} - f_1}(\mu_1 - Thrs) & \text{for } f_{min} \leq f < f_{peak} \\ Thrs & \text{for } f = f_{peak} \\ \mu_2 - \dfrac{f_2 - f}{f_2 - f_{peak}}(\mu_2 - Thrs) & \text{for } f_{peak} < f \leq f_{max}, \end{cases}$$

where $f_{min}$ is minimum processing frequency, $f_{max}$ is maximum processing frequency, $f_{peak}$ is peak frequency of the swell noise, Thrs is the user's input value for the threshold factor at the peak frequency, and $$f_1 = f_{min} - \Delta f$$

$$f_2 = f_{max} + \Delta f,$$

where $\Delta f$ is the step frequency, and $$\mu_k = \frac{\max\{\hat{R}_k\}}{\text{median}\{\hat{R}_k\}} \text{ for } k = 1, 2,$$

at frequency $f_k$.

12. The medium of claim 11, wherein the constructing iteratively residuals comprises applying the following equation:

$$\begin{aligned}\hat{R}^{(t-1)} &= D - \hat{S}^{(t-1)} \\ &= (d_1 - s_1^{(t-1)}, d_2 - s_2^{(t-1)}, \ldots, d_n - s_n^{(t-1)}) \\ &= (r_1^{(t-1)}, r_2^{(t-1)}, \ldots, r_n^{(t-1)}).\end{aligned}$$

13. The medium of claim 11, wherein the determining if sufficient iterations t have occurred comprises applying the following equation:

$$A^{(T)} \approx A^{(T-1)},$$

for T=t.

14. The medium of claim 11, wherein the determining if a trace is noisy comprises applying the following equation:

$$|r_k^{(T)}| \geq A^{(T)}.$$

* * * * *